(12) United States Patent
Hansen

(10) Patent No.: US 7,880,480 B2
(45) Date of Patent: Feb. 1, 2011

(54) OCCUPANT DETECTION SYSTEM AND METHOD FOR CALIBRATING

(75) Inventor: Mark C. Hansen, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 83 days.

(21) Appl. No.: 12/433,011

(22) Filed: Apr. 30, 2009

(65) Prior Publication Data

US 2009/0295411 A1    Dec. 3, 2009

Related U.S. Application Data

(63) Continuation-in-part of application No. 12/150,439, filed on Apr. 28, 2008.

(60) Provisional application No. 61/126,120, filed on May 1, 2008.

(51) Int. Cl.
*G01R 27/26* (2006.01)
*B60R 21/16* (2006.01)
*G08B 21/00* (2006.01)

(52) U.S. Cl. ................. 324/681; 280/735; 340/667

(58) Field of Classification Search ............. 324/681, 324/658, 649, 600, 635, 644, 662, 671, 699, 324/716, 674; 340/540, 541, 561, 562, 665, 340/666, 667, 438; 280/734, 735; 701/45, 701/47, 49

See application file for complete search history.

(56) References Cited

U.S. PATENT DOCUMENTS

| | | | |
|---|---|---|---|
| 5,914,610 A | 6/1999 | Gershenfeld et al. | |
| 6,161,070 A | 12/2000 | Jinno et al. | |
| 6,179,378 B1 | 1/2001 | Baumgartner et al. | |
| 6,208,249 B1 * | 3/2001 | Saito et al. | 340/561 |
| 6,266,592 B1 * | 7/2001 | LeMense | 701/45 |
| 6,275,146 B1 * | 8/2001 | Kithil et al. | 340/425.5 |
| 6,392,542 B1 * | 5/2002 | Stanley | 340/561 |
| 6,556,137 B1 | 4/2003 | Oka et al. | |
| 6,559,555 B1 | 5/2003 | Saitou et al. | |
| 6,644,689 B2 | 11/2003 | Murphy | |
| 6,696,948 B2 | 2/2004 | Thompson et al. | |
| 6,810,313 B2 * | 10/2004 | Cooper et al. | 701/45 |
| 6,816,077 B1 | 11/2004 | Shieh et al. | |
| 6,877,606 B2 | 4/2005 | Hardy | |

(Continued)

FOREIGN PATENT DOCUMENTS

WO    WO9513204    5/1995

OTHER PUBLICATIONS

Pending U.S. Appl. No. 12/150,439, filed Apr. 28, 2008.

(Continued)

*Primary Examiner*—Hoai-An D Nguyen
(74) *Attorney, Agent, or Firm*—Thomas N. Twomey

(57) ABSTRACT

A method includes measuring a first frequency response of an electrode at a first frequency across a range of environmental conditions, measuring a second frequency response of the electrode at a second frequency across the range of environmental conditions, and comparing the first and second frequency responses measured to define a data set representing an effect of the environmental conditions. An occupant detection system includes an electrode and a detector circuit. The detector circuit is configured to measure an actual frequency response of the electrode and compare the actual frequency response to the data set to determine the effect of the current environmental condition.

20 Claims, 5 Drawing Sheets

U.S. PATENT DOCUMENTS

| | | |
|---|---|---|
| 6,960,841 B2 | 11/2005 | Saitou et al. |
| 7,048,338 B2 | 5/2006 | Pinkos |
| 7,084,763 B2 | 8/2006 | Shieh et al. |
| 7,102,527 B2 | 9/2006 | Shieh et al. |
| 7,151,452 B2 | 12/2006 | Shieh |
| 7,164,349 B2 * | 1/2007 | Kawaura et al. ............ 340/435 |
| 7,194,346 B2 | 3/2007 | Griffin et al. |
| 2004/0111201 A1 | 6/2004 | Thompson et al. |
| 2004/0196150 A1 * | 10/2004 | Shieh et al. ................. 340/501 |
| 2004/0199318 A1 * | 10/2004 | Shieh et al. .................. 701/45 |
| 2005/0253712 A1 | 11/2005 | Kimura et al. |
| 2006/0187038 A1 | 8/2006 | Shieh et al. |
| 2007/0029768 A1 * | 2/2007 | Clos et al. ................... 280/735 |
| 2008/0265912 A1 * | 10/2008 | Gasperi ...................... 324/652 |
| 2009/0267622 A1 * | 10/2009 | Hansen et al. .............. 324/684 |
| 2010/0188242 A1 * | 7/2010 | Petereit et al. .............. 340/667 |

OTHER PUBLICATIONS

Pending U.S. Appl. No. 12/432,975, filed Apr. 30, 2009.

* cited by examiner

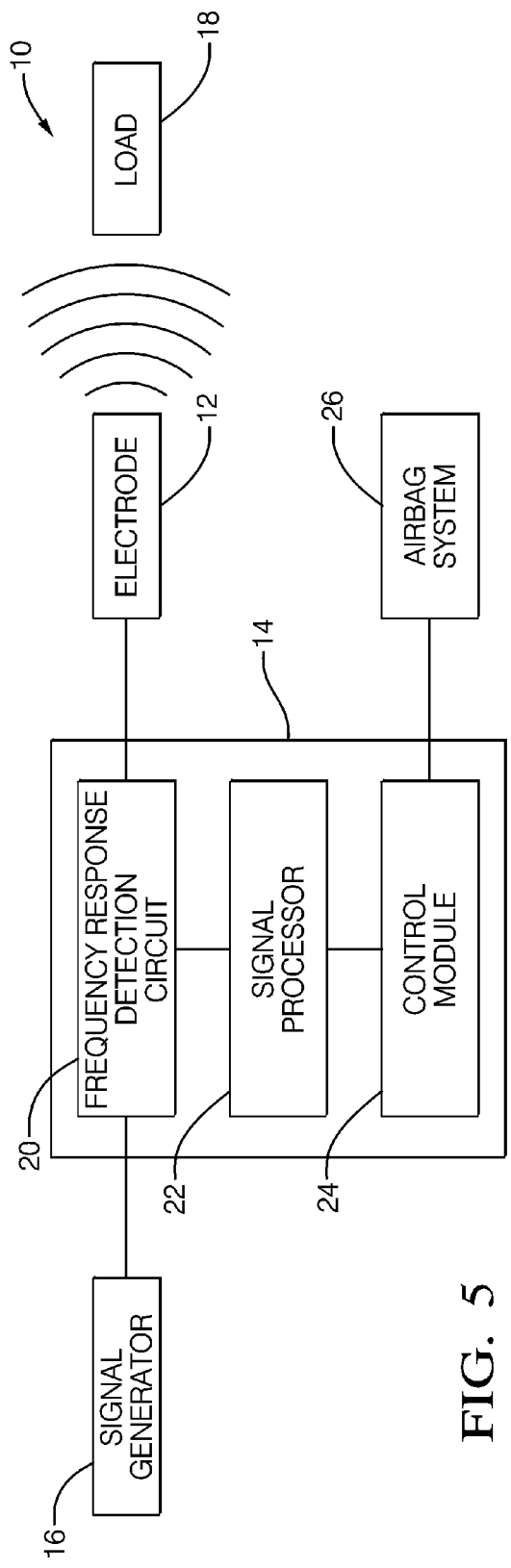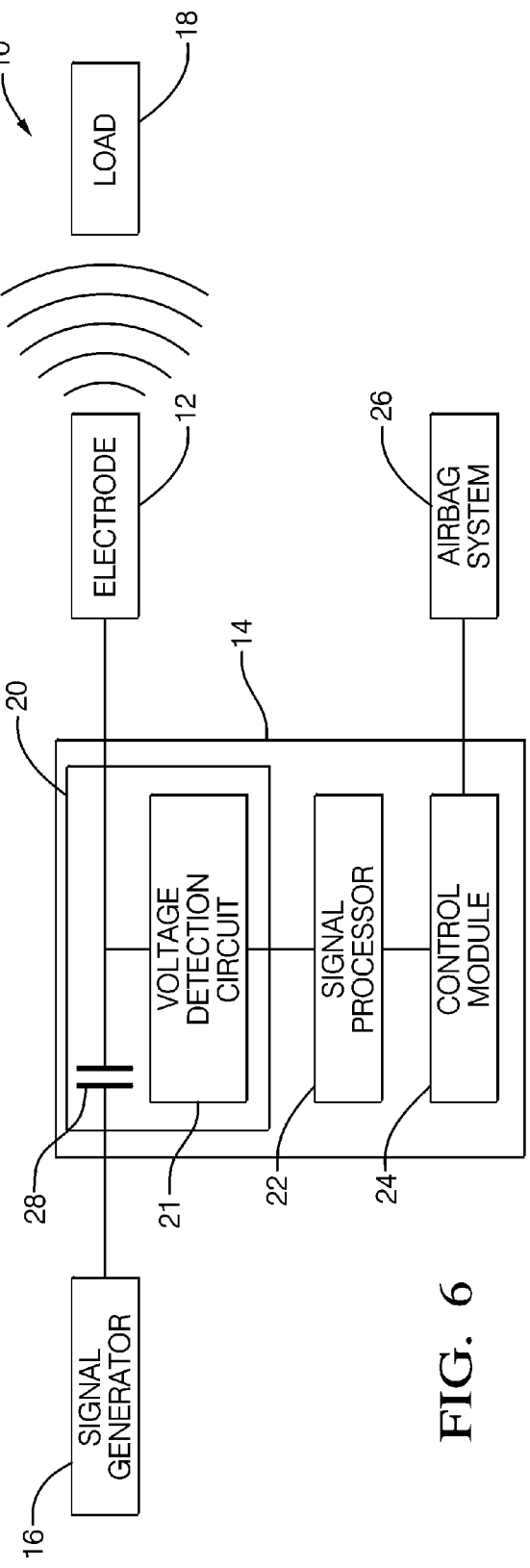

OCCUPANT DETECTION SYSTEM AND METHOD FOR CALIBRATING

CROSS-REFERENCE TO RELATED APPLICATIONS

This application is a continuation-in-part of pending U.S. patent application Ser. No. 12/150,439, filed on May 28, 2008, the contents of which are fully incorporated herein by reference. In addition, this application claims priority to U.S. Provisional Application Ser. No. 61/126,120, filed on May 1, 2008.

BACKGROUND

Occupant detection systems have the ability to determine the presence and/or characteristics of an occupant at a specific location. However, environmental conditions, such as humidity and moisture, may interfere with the occupant detection system's readings.

Although useful in a wide variety of industries, occupant detection systems may be used in automotive applications to determine whether a person is present in a vehicle, and if so, the size of the person. This information serves various purposes, including enabling/disabling an airbag system. In many vehicles, each seat has at least one corresponding airbag. Generally, during an accident, the airbags are deployed so long as a person is detected in the corresponding seat. While airbags have been known to provide additional safety to adult and larger children traveling in vehicles, it is not always ideal to deploy the airbag even though a person is detected. For this reason, the occupant detection system further determines the person's size before enabling/disabling the airbag system.

Although occupant detection systems may be generally reliable, environmental conditions like humidity in the air or moisture on the seat may interfere with the occupant detection system's ability to determine the person's presence or size. For instance, humidity or moisture may cause some children or car seats to be mischaracterized as adults. Accordingly, an occupant detection system is needed that compensates for environmental conditions. However, before doing so, the occupant detection system must be calibrated.

SUMMARY

A method includes measuring a first frequency response of an electrode at a first frequency across a range of environmental conditions, measuring a second frequency response of the electrode at a second frequency across the range of environmental conditions, and comparing the first and second frequency responses measured to define a data set representing an effect of the environmental conditions.

An occupant detection system includes an electrode and a detector circuit in communication with the electrode and configured to measure the actual frequency response of the electrode and compare the actual frequency response to the data set to determine an effect of an environmental condition.

BRIEF DESCRIPTION OF THE DRAWINGS

FIG. 5 is a schematic diagram of an exemplary occupant detection system, according to an embodiment;

FIG. 6 is a schematic diagram of another exemplary occupant detection system, according to an embodiment.

DETAILED DESCRIPTION

Occupant detection systems include an electrode in communication with a detector circuit that detects and compensates for environmental conditions, such as moisture and humidity, because such environmental conditions may interfere with the occupant detection system's ability to detect the presence and/or size of an occupant. However, before doing so, the occupant detection system must be calibrated, or in other words, programmed to recognize the presence of environmental conditions. Calibrating the occupant detection system includes measuring a first and second frequency response of the electrode at a first and second frequency, respectively, across a range of environmental conditions, and comparing the first and second frequency responses measured to define a data set. Once calibrated, the occupant detection system may be used to detect environmental conditions. Therefore, the method may include measuring an actual frequency response of the electrode, comparing the actual frequency response of the electrode to the data set to determine whether the environmental condition exists, and using the comparison to correct or compensate the actual frequency response of the electrode to determine the presence and/or size of an occupant.

Figure 7:
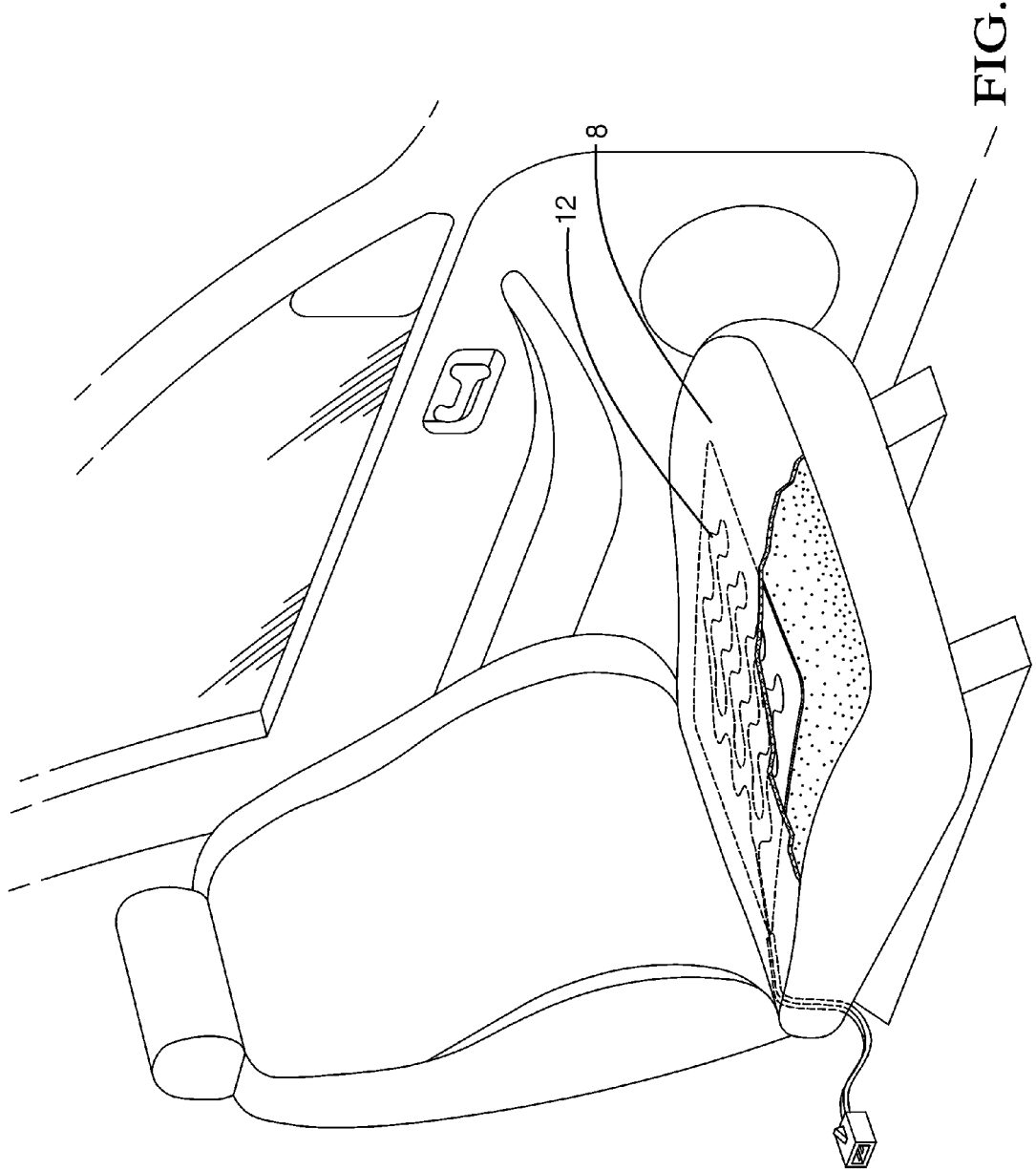
FIG. 7 is a perspective view of a seat assembly according to an embodiment.

FIG. 7 is a perspective view of a seat assembly 8 having an electrode 12 disposed within the seat assembly 8, underneath the seat upholstery. The seat assembly 8 is shown within a vehicle interior and is for supporting an occupant (not shown). The occupant may be an individual person of any size, either sitting on the seat or may be an infant or child sitting in a child seat, where the child seat is secured to the seat assembly 8 with a seat belt (not shown) or some other means of secure attachment. The electrode 12 is depicted as a wire similar to a seat heating element, but could also be formed using foil or other electrically conductive element.

FIG. 5 is a block diagram of an exemplary occupant detection system 10 that includes the electrode 12 having an impedance in communication with a detector 14. The electrode 12 receives the signals generated by the detector 14 and radiates an electromagnetic field toward an object to be detected. A load 18 is a variable load coupled to the electrode 12 for establishing the impedance of the electrode 12. The load 18 is indicative of the size of a seat occupant or an empty seat, and an environmental condition. The detector 14 outputs a signal to an airbag system 26 to enable the airbag based on the determined size of an occupant. This system is described in more detail in U.S. patent application Ser. No. 12/150,439 by Hansen et al., filed May, 28, 2008. Changing environmental conditions may adversely affect the ability of the detector 14 to determine the size of the occupant, so the detector 14 is configured to compensate the impedance readings for the environmental condition. Thus, the detector 14 is in communication with the electrode 12 and is configured to detect an impedance indicative of the load 18, determine the presence of an environmental condition based on the impedance, and determine an occupant based upon the impedance and the environmental condition.

As discussed above, environmental conditions may affect how the occupant detection system operates. In the vehicle, moisture or humidity may be found in the passenger compartment, on the seat, or in the foam of the seat. Unfortunately, moisture levels in a vehicle can change instantly due to spilled drinks, rain coming through an open window or door, a sick child, a wet bathing suit, or from humidity in the air, among others. This moisture may cause the occupant detection system to detect a person who is not present in the seat, or misclassify children as adults since the environmental condition may change the apparent impedance of the occupant. To accurately detect the presence and size of passengers, automotive systems rely on the automotive detection system to function independently of changes in environmental conditions. For example, the occupant detection system is able to enable or disable an airbag system based on the presence and size of the passenger without interference from environmental conditions because the occupant detection system can detect and compensate for environmental conditions.

Figure 1:
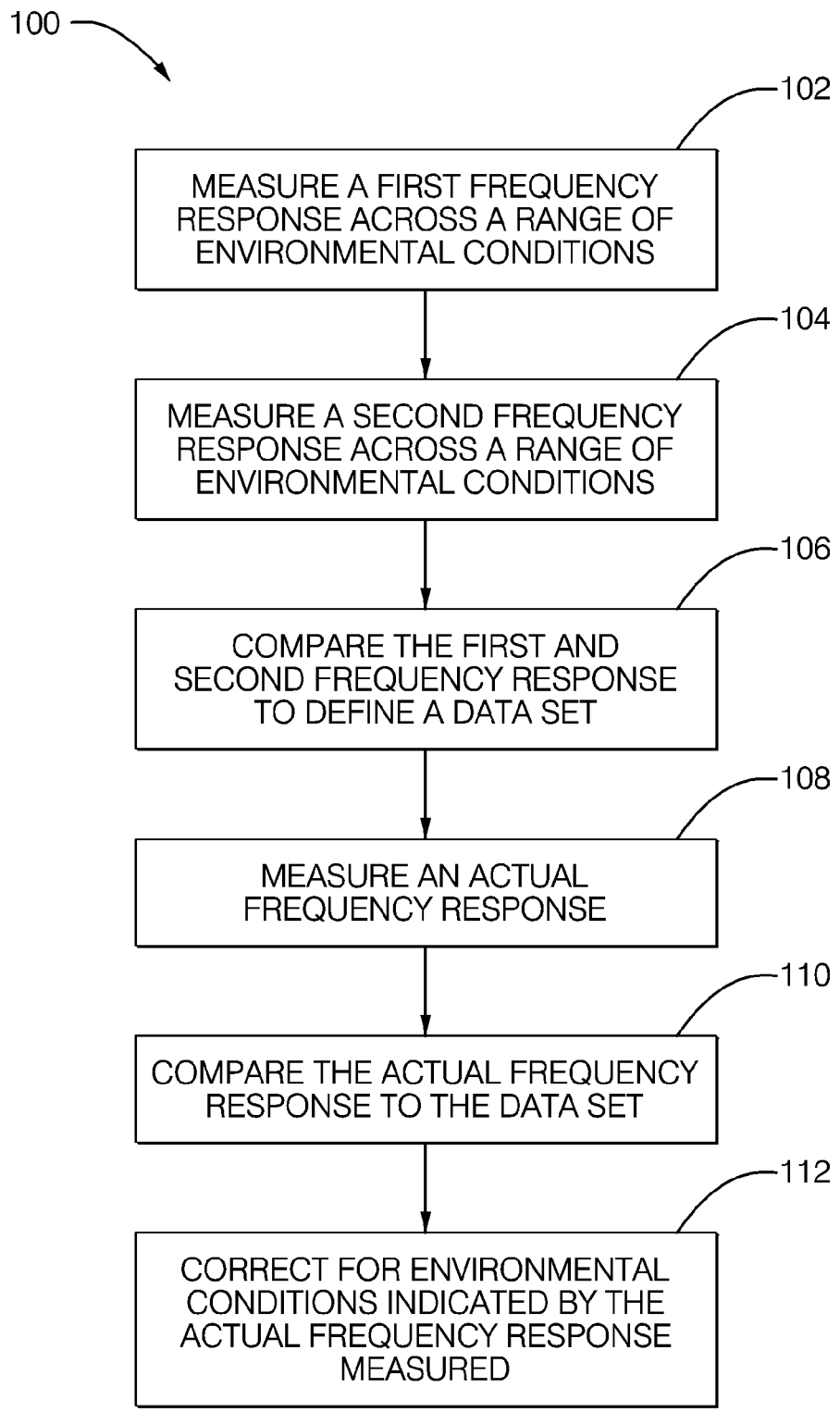
FIG. 1 is a flowchart of an exemplary method of calibrating an occupant detection system and detecting the presence of an occupant independent of an environmental condition, according to an embodiment.

FIG. 1 is a flowchart illustrating an exemplary method 100 of calibrating an occupant detection system and detecting the presence of an occupant independent of environmental conditions. Environmental conditions affect a frequency response of an electrode that is part of the occupant detection system. Therefore, the occupant detection system must know the normal operating parameters of the electrode (i.e., the frequency response of the electrode when no environmental conditions are present) if it is to detect and compensate for the environmental conditions. To do so, the method 100 includes a step 102 of measuring a first frequency response of the electrode at a first frequency across a range of environmental conditions and a step 104 of measuring a second frequency response of the electrode at a second frequency across the range of environmental conditions. The method 100 further includes a step 106 of comparing the frequency responses measured to define a data set representing the impact of the environmental conditions on the system. In other words, the data set represents the relationship between the frequency responses measured and the effect each of the environmental conditions. For example, the data set may be a list of values stored in a database, or may be an equation. Therefore, the step of comparing the frequency responses may include determining the relationship between the frequency responses. In one exemplary approach, it may be determined that the frequency responses have a linear relationship when plotted relative to one another. Because the data set represents frequency responses across the range of environmental conditions, a difference between an actual frequency response measured and the data set may indicate the presence and/or magnitude of the environmental condition. Accordingly, the method 100 may include a step 108 of measuring the actual frequency response of the electrode, and a step 110 of comparing the actual frequency response to the data set to determine whether the environmental condition exists. If the data set is stored in the database as a lookup table, the step 110 of comparing may include accessing the lookup table. Moreover, the method 100 may include a step 112 of correcting for the environmental condition indicated by the actual frequency response, such as by applying a correction factor that accounts for any environmental influence. As discussed in greater detail below, the correction factor may be subtracted from the actual frequency response measured, or the equation for correcting the frequency response may include multiplying the frequency response of the electrode by the correction factor, which in this example, may be a number between −1 and 1. The specific correction factor corresponding to the frequency response may be stored in a table in the database. Also, the equation may be automatically generated from a principle component analysis, which may be found in several computer statistical software packages, using an input set of data with various input loads at various environmental frequencies.

Figure 2:
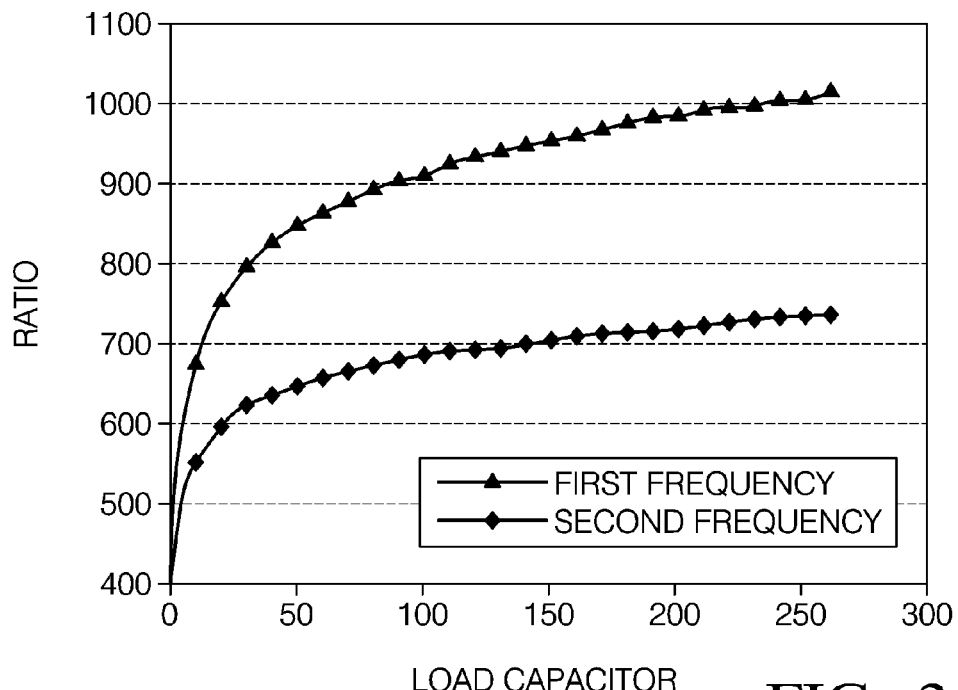
FIG. 2 is a graph of an exemplary non-linear response of an electrode to a load at first and second frequencies, according to an embodiment.

FIG. 2 illustrates an exemplary non-linear frequency response of the electrode to a load (i.e., the impedance caused by an occupant and environmental conditions) at the first and second frequencies. The magnitude of the load may be represented by capacitance on the X-axis, and the response of the system to the load is represented on the Y-axis. As the load increases, there is a non-linear response to the output. Similarly, although not illustrated in FIG. 1 or 2, the method 100 may further include measuring a third frequency response at a third frequency, and so on. Any additional frequency responses measured, including the third frequency response, may have similar non-linear characteristics when plotted.

Figure 3:
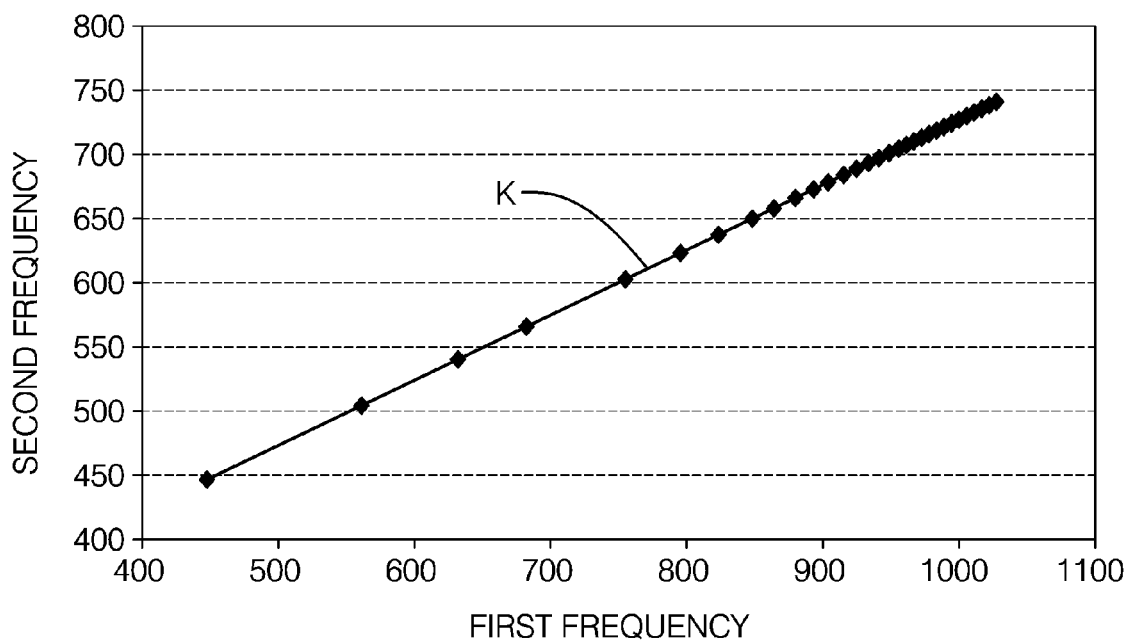
FIG. 3 is a an exemplary X-Y graph of a first and second frequency response, according to an embodiment.

FIG. 3 illustrates an exemplary X-Y graph of the first and second frequencies, respectively. In the embodiment illustrated, the result is a line having a slope K that shows that the mathematical relationship between the first and second frequency responses is linear. In one embodiment, the circuit output of the first and second frequencies may be estimated as a log function having a base "a" for the first frequency and a base "b" for the second frequency. The ratio of the two log functions is a constant factor, graphed as slope K.

Figure 4:
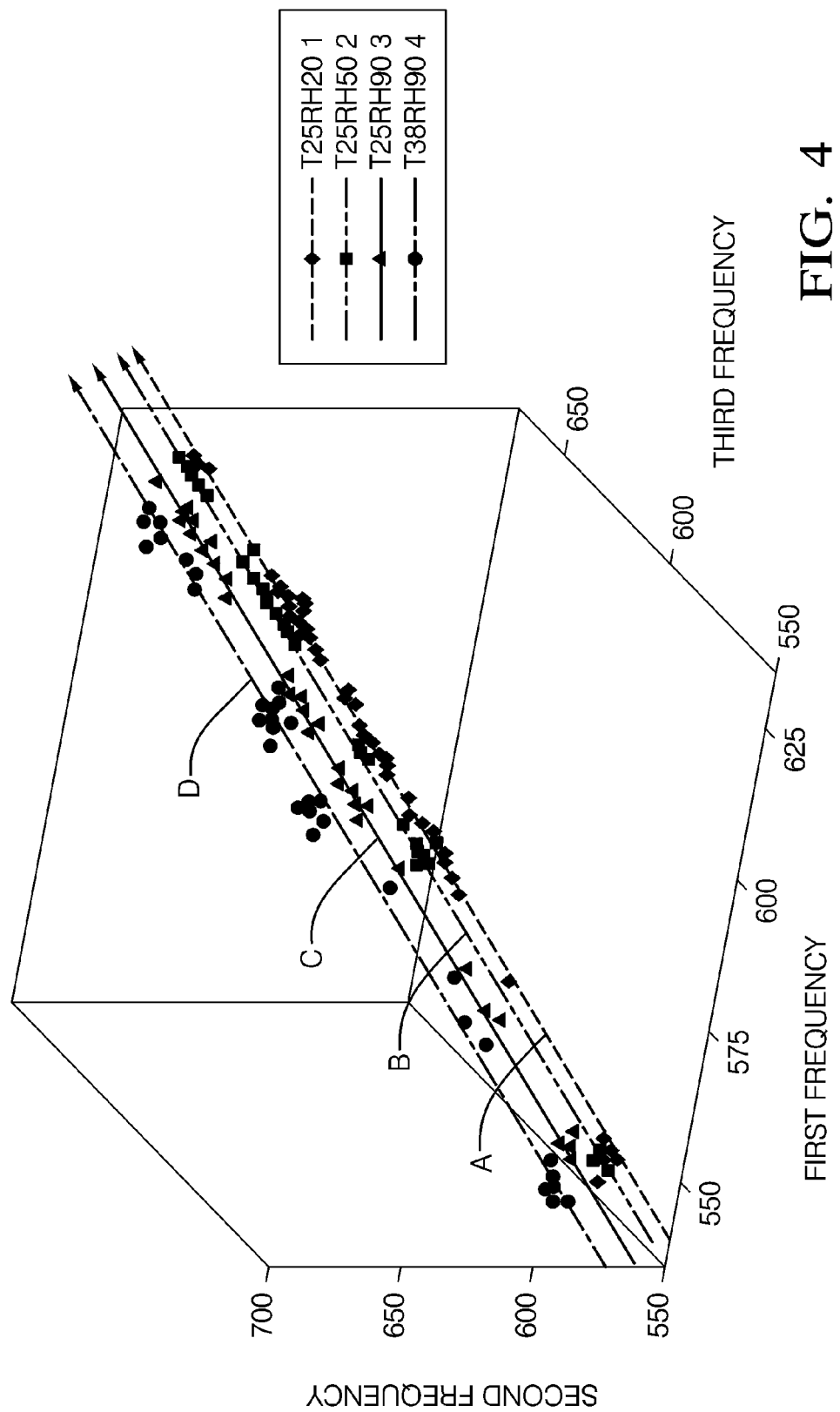
FIG. 4 is an exemplary X-Y-Z graph of a first, second, and third frequency response, according to an embodiment.

The same may be true for additional frequency response measurements, but the plane becomes a hyper-plane of degree n, where n is the number of frequencies used. For example, referring to FIG. 4, the third frequency response may be plotted against the first and second frequency responses in an X-Y-Z graph. Again, the result may be a three-dimensional line having a slope anchored in space that indicates that the mathematical relationship between the first, second, and third frequency responses is linear when plotted. As environmental conditions change, the location of the response line in space changes. However, environmental conditions will determine which line the response will be on. For example, referring to FIG. 4, line A is formed from the frequency responses when temperature is at 25 degrees Celsius and relative humidity is low (e.g., approximately 20%). Line B is formed from frequency responses when humidity is higher than in line A (e.g., approximately 50%). Line C is formed from frequency responses when humidity is higher than in Lines A and B (e.g., approximately 90%), and Line D is formed from frequency responses when both humidity and temperature are higher than in Lines A-C (e.g., temperature is 38 degrees Celsius and relative humidity is approximately 90%). In this exemplary approach, the values on Line A make up the data set, and values above or below that line (e.g., the values on Lines B-D) may indicate that the environmental condition is present. The data set may be stored in the database as an equation or as a lookup table based on the plurality of frequency responses that represent the effect of each of the environmental conditions. For example, in an embodiment where three frequency responses are measured, the equation may be as follows:

$$Y = W_{low} * F_{low} + W_{med} * F_{med} + W_{high} * F_{high},$$

where $W_{low}$, $W_{med}$, and $W_{high}$ represent calibrated input constants that are less than or equal to 1 and greater than or equal to −1, and $F_{low}$, $F_{med}$, and $F_{high}$ represent the three frequency responses measured. Y represents the magnitude of the environmental effect, and specifically, a larger magnitude (i.e., value for Y) represents a larger environmental effect.

In one embodiment, linear algebra may be used to translate the line in space into a translated X-axis. Changes in the frequency response of the system caused by environmental conditions may then be illustrated as being above or below the X-axis, for example, the entire line is shifted in the positive Y direction as humidity or water content increases. Similarly, in a three-dimensional view, changes in the frequency response correlation values caused by noise may be illustrated as being in front of or behind the X-axis, for example, along a Z-axis. Therefore, although not illustrated, values on the translated X-axis indicate occupant load, values on the Y-axis indicate environmental conditions, and values along the Z-axis indicate noise.

FIG. 5 is a schematic diagram of an exemplary occupant detection system 10 employing the method 100 described above using an electrode 12 in communication with a detector circuit 14. Although it may be used in various industries, when used in automotive applications, the electrode 12 may be located underneath the vehicle seat upholstery. Under normal levels of absolute humidity, the electrode 12 responds well to the mass of the occupant, and larger occupants (i.e., adults) are consistently distinguished from smaller occupants (i.e., smaller children or car seats). As previously discussed, the detector circuit 14 is configured to measure the actual frequency response of the electrode 12 and compare the actual frequency response to the data set to determine whether the environmental condition exists. As previously discussed, the data set is calculated from at least the first and second frequency responses of the electrode 12 independent of the environmental conditions.

A signal generator 16 that generates a plurality of signals having the same magnitude but different frequencies is in communication with the electrode 12. In other words, the signal generator 16 generates a first signal at the first frequency, a second signal at the second frequency, and so on, over the operating range of the electrode 12. The operating range of the electrode 12 may be any range in which the detector circuit 14 can detect reliable data. For instance, the operating range of the electrode 12 may be 10 KHz to 1.0 MHz, although this range is merely exemplary.

The electrode 12 receives the signals generated by the signal generator 16 and radiates an electromagnetic field toward an object to be detected. The presence of the object provides impedance that alters the magnitude of the electromagnetic field. Environmental conditions, such as humidity or moisture, can change the magnitude of the electromagnetic field. The impedance of the object being detected and the environmental conditions is collectively known as the impedance of a load 18.

The detector circuit 14 includes a frequency response detection circuit 20 in communication with the signal generator 16 and the electrode 12. The frequency response detection circuit 20 is configured to detect a signal on the electrode 12 produced by the signal generator 16 at each of the frequencies within the operating range of the electrode 12. Specifically, as the signal generator 16 outputs the signal and sweeps through the frequencies in the operating range of the electrode 12, the frequency response detection circuit 20 samples the signal on the electrode 12 at predetermined intervals.

Changes to the frequency response of the electrode 12 may indicate the presence of an environmental condition. In other words, the presence of an environmental condition is manifested as a change in the frequency response of the electrode 12. Accordingly, the detector circuit 14 is configured to measure the frequency response of the electrode 12. Specifically, the detector circuit 14 includes a signal processor 22 in communication with the frequency response detection circuit 20 that measures the actual frequency response of the electrode 12 at each frequency generated by the signal generator 16 based on the signals detected.

The detector circuit 14 further includes a control module 24 in communication with the signal processor 22. The control module 24 receives signals and data transmitted by the signal processor 22 and determines whether the environmental condition exists by comparing the actual frequency response measured to the data set. The data set may be stored in a database that is in communication with the detector circuit 14, so the control module 24 may further be configured to access the database and, accordingly, access the data set. Since the data set represents the frequency response across environmental conditions, it may be determined that the environmental condition exists by where the actual frequency response maps into the data set. Then, the control module 24 is configured to compensate for the environmental condition by outputting a signal so that the result is independent of the affects of the environmental conditions.

In one embodiment, the occupant detection system 10 may be used in a vehicle with an airbag system 26 that is selectively enabled or disabled based on the characteristics of the passenger in the seat. For instance, it may be beneficial to only enable the airbag system 26 if an adult or larger child is sitting in the vehicle seat. Because impedance is inversely proportional to the size of the object, a larger person will have a smaller impedance, and the occupant detection system 10 can detect the size of the person in the seat based on impedance. However, since environmental conditions may change the impedance of the load 18, the airbag system 26 receives the adjusted signal from the control module 24 indicating whether the airbag system 26 should be enabled or disabled based on the size and presence of the occupant independent of the environmental conditions.

FIG. 6 illustrates another embodiment of the occupant detection system 10 that includes a reference impedance, here illustrated as a capacitor 28, in communication with a voltage detection circuit 21. One of ordinary skill in the art understands that the reference impedance may include any combination of electrical components that create a reference impedance network, including purely resistive or partially reactive components. Alternatively, the detector circuit 14 may include a current detection circuit (not shown) instead of or in addition to the voltage detection circuit 21, such that the current detection circuit detects the current flowing to the electrode 12. Other types of detection circuits, besides voltage and current detection circuits as described herein may also be used.

The above description is intended to be illustrative and not restrictive. Many alternative approaches or applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. In sum, it should be understood that the invention is capable of modification and variation and is limited only by the following claims.

The present embodiments have been particularly shown and described, which are merely illustrative of the best modes. It should be understood by those skilled in the art that various alternatives to the embodiments described herein may be employed in practicing the claims without departing from the spirit and scope as defined in the following claims. It is intended that the following claims define the scope of the invention and that the method and apparatus within the scope of these claims and their equivalents be covered thereby. This description should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

I claim:

1. A method for detecting an occupant in a seat, comprising the steps of:
    measuring a first frequency response of an electrode at a first frequency across a range of environmental conditions;
    measuring a second frequency response of the electrode at a second frequency across the range of environmental conditions;
    comparing the first and second frequency responses measured to define a data set representing an effect of the environmental conditions, and using the data set to compensate for environmental conditions when detecting an occupant;
    measuring an actual frequency response of the electrode; and
    comparing the actual frequency response of the electrode to the data set to determine an effect of a current environmental condition.

2. A method as set forth in claim 1, further comprising correcting for the environmental condition indicated by the actual frequency response.

3. A method as set forth in claim 2, wherein correcting for the environmental condition includes applying a correction factor to the actual frequency response measured.

4. A method as set forth in claim 1, wherein comparing the first and second frequency responses includes determining a mathematical relationship between the first frequency response and the second frequency response.

5. A method as set forth in claim 4, wherein the mathematical relationship between the first frequency response and the second frequency response is linear in a location in space.

6. A method as set forth in claim 4, wherein comparing the first and second frequency responses includes plotting the first frequency response relative to the second frequency response.

7. A method as set forth in claim 6, wherein the data set has a constant slope when plotted.

8. A method as set forth in claim 1, further comprising measuring a third frequency response of the electrode at a third frequency across the range of environmental conditions, and wherein comparing the first and second frequencies is further defined as comparing the first frequency response, the second frequency response, and the third frequency response to define the data set.

9. A method as set forth in claim 8, further comprising measuring more than 3 frequency responses of the electrode at more than three frequencies across the range of environmental conditions, and wherein comparing the first and second frequencies is further defined as comparing each frequency response to define the data set.

10. A method as set forth in claim 1, further comprising storing the data set in a lookup table.

11. A method as set forth in claim 10, wherein comparing the actual frequency response to the data set includes accessing the lookup table.

12. An occupant detection system comprising:
    an electrode; and
    a detector circuit in communication with said electrode and configured to measure an actual frequency response of said electrode and compare the actual frequency response of said electrode to a data set to determine an effect of an environmental condition; wherein said data set is defined by comparing a first frequency response measured by said electrode across a range of environmental conditions to a second frequency response measured by said electrode across the range of environmental conditions;
    said detector circuit includes a signal processor;
    said signal processor is configured to measure the actual frequency response of said electrode;
    said signal processor is configured to access a database configured to contain said data set; and
    said signal processor is configured to compare the actual frequency response to said data set to determine the effect of a current environmental condition.

13. An occupant detection system as set forth in claim 12, wherein said detector circuit includes a control module in communication with said signal processor.

14. An occupant detection system as set forth in claim 13, wherein said control module is configured to receive a signal from said signal processor and detect and compensate for an effect of a current environmental condition indicated by the signal if the environmental condition is present.

15. An occupant detection system as set forth in claim 12, wherein said electrode includes a signal generator in communication with said detector circuit, and wherein said signal generator is configured to generate a first signal at a first frequency and a second signal at a second frequency.

16. An occupant detection system as set forth in claim 15, wherein said detector circuit includes a voltage detection circuit in communication with said signal generator, and wherein said voltage detection circuit is configured to detect a voltage at a plurality of different frequencies.

17. An occupant detection system as set forth in claim 14, wherein said control module is further configured to enable or disable an airbag system independent of the environmental condition.

18. A method comprising the steps of:
    defining a data set representing a range of environmental conditions;
    measuring an actual frequency response;
    comparing the actual frequency response to the data set to determine an effect of a current environmental condition; and
    the step of defining the data set includes measuring a plurality of frequency responses at a plurality of frequencies of an electrode across the range of environmental conditions and generating an equation based on the plurality of frequency responses that represents the effect of the current environmental condition.

19. A method as set forth in claim 18, wherein measuring the plurality of frequency responses includes measuring three frequency response, and wherein the equation defining the environmental effect is:

$$Y = W_{low} * F_{low} + W_{med} * F_{med} + W_{high} * F_{high},$$

wherein $W_{low}$, $W_{med}$, and $W_{high}$ represent calibrated input constants, and $F_{low}$, $F_{med}$, and $F_{high}$ represent the three frequency responses measured, and wherein Y represents a magnitude of the effect of the current environmental condition.

20. A method as set forth in claim 19, wherein $W_{low}$, $W_{med}$, and $W_{high}$ are less than or equal to 1 and greater than or equal to −1.

* * * * *

UNITED STATES PATENT AND TRADEMARK OFFICE
CERTIFICATE OF CORRECTION

| | | |
|---|---|---|
| PATENT NO. | : 7,880,480 B2 | Page 1 of 1 |
| APPLICATION NO. | : 12/433011 | |
| DATED | : February 1, 2011 | |
| INVENTOR(S) | : Mark C. Hanson and Inacio Matsuo | |

It is certified that error appears in the above-identified patent and that said Letters Patent is hereby corrected as shown below:

Title page, Item (75) Inventor: under "Mark C. Hansen, Kokomo, IN (US)", please insert
-- Inacio Matsuo, Kokomo, IN (JP) --.

Signed and Sealed this
First Day of May, 2012

David J. Kappos
*Director of the United States Patent and Trademark Office*